United States Patent
Hansson

[19]

[11] Patent Number: 6,125,993
[45] Date of Patent: Oct. 3, 2000

[54] HYDRAULIC ROLLER

[76] Inventor: Ulf G. Hansson, 23318 SE. 13th Ct., Issaquah, Wash. 98029

[21] Appl. No.: 08/959,515

[22] Filed: Oct. 28, 1997

[51] Int. Cl.⁷ .................................................. B65G 13/06
[52] U.S. Cl. ............................................... 198/788
[58] Field of Search .................... 198/835, 788; 92/56, 57, 58, 117 A

[56] References Cited

U.S. PATENT DOCUMENTS

| | | | |
|---|---|---|---|
| 3,362,686 | 1/1968 | MacKay | 254/150 |
| 4,082,180 | 4/1978 | Chung | 198/835 |
| 5,732,813 | 3/1998 | Nielsen et al. | 198/788 |

*Primary Examiner*—Christopher P. Ellis
*Assistant Examiner*—Kenneth W Bower
*Attorney, Agent, or Firm*—Graybeal Jackson Haley LLP

[57] ABSTRACT

The present invention relates to a drive roller for endless-belt or chain-belt conveyors. It is powered by a hydraulic motor that is wholly enclosed within the roller. One shaft of the roller is stationary and is ported to permit passage of hydraulic fluid to and from the motor. The stationary shaft terminates in a flange that is bolted to the hydraulic motor end plate to provide simple yet robust support for the motor. The fluid ports are within this flange and are O-ring sealed. The second roller shaft rotates with the outer drum. This novel and simple design requires only one internal bearing thus greatly reducing the complexity and cost compared to prior art drive rollers. The hydraulic roller is readily mounted on existing conveyor structures.

22 Claims, 2 Drawing Sheets

HYDRAULIC ROLLER

TECHNICAL FIELD

This invention relates to drive means for endless-belt conveyors and more particularly to such drive means powered by a hydraulic motor contained within a rotatably supported drum or roller.

BACKGROUND OF THE INVENTION

It is common practice in the conveying arts to drive a load-carrying, endless belt or chain belt by providing torque to one of the end rollers which supports the belt and defines its path. Traditionally, this mode of torque input has been accomplished by coupling an externally mounted electric or fluid motor to one shaft of the end roller, either directly or by a power transfer means such as a chain and sprockets.

This use of external hardware, however, is often undesirable for several reasons: From a safety standpoint, this external power arrangement presents the obvious hazards associated with rotating shafts, sprockets and chains. Furthermore, if electric powered, the potential for electric shock exists. From a sanitation point of view, it is necessary to keep the drive hardware from contaminating the conveyed product. This is a serious challenge for hydraulic powered conveyors, especially in the food processing industry. Likewise, the drive hardware must also be sanitizeable which presents additional challenges and costs. A further drawback to externally powered conveyors is the physical space requirement for the drive machinery. In many factories, such as those aboard vessels, space is very limited.

Accordingly, attempts have been made to provide a powered conveyor roller with an internal drive means. U.S. Pat. No. 3,376,758, issued to MacKay, is typical of the numerous electric motor driven disclosures. While providing a space-saving and sanitary solution, these electric powered rollers still represent a potential shock hazzard. Furthermore, in most applications, a costly gear reduction system must be included in the roller to achieve a usable belt speed. To provide a variable belt speed with this system requires an additional, expensive electrical control system such as a frequency controller. Moreover, in higher load applications, some provision must be made to remove the heat dissipated within the roller by the electric motor. Cooling means such as by forced air result in additional costs and require the abandonment of a hermetically sealed system.

The advantages of hydraulic motors; high power in a small package, easily varied speed and removal of dissipated heat with return oil flow, lend themselves quite readily to an internally powered conveyor roller. U.S. Pat. No. 4,013,166, issued to Weady et al., discloses an arrangement that appears similar to the present invention yet has quite serious disadvantages. Chief among these disadvantages are the large number of parts and high number of machining operations required to produce the roller. Four ball-bearing assemblies are employed along with the numerous attendant parts that must be machined to quite close tolerances. Moreover, in applications wherein the roller length is substantially longer than the internal hydraulic motor, the Weady design exhibits a significant disadvantage relative to the present invention; both shafts must span the full distance from the hydraulic motor through the endplates. All these factors contribute to a roller that is very expensive to produce. Disassembly is also quite complicated due to the high number of parts and bearings, resulting in high maintainence costs.

The motorized conveyor roller disclosed in U.S. Pat. No. 4,082,180, issued to Chung, suffers from the above mentioned dissadvantages of electric-motor powered rollers: potential for electric shock, the need for expensive gear reduction, and cooling difficulties. It is stated that the Chung design is only intended for relatively small conveyors and it is obvious that heat build-up would be a major problem at even modest horsepower ratings. Furthermore, like the Weady design, the Chung roller is not readily adaptable to rollers longer than the internal motor.

SUMMARY OF THE INVENTION

In light of these considerations, it is an object of the present invention to provide an internally-powered hydraulic conveyor roller that is of simple yet rugged construction.

It is a second object of this invention to provide a hydraulic roller that is economical to manufacture and maintain.

It is a third object of this invention to provide a hydraulic roller design that is readily adaptable to different roller lengths.

It is an additional object of this invention to provide a hydraulic roller that is easy to disassemble.

It is an further object of this invention to provide a hydraulic roller that is readily mounted to existing conveyor structures.

It will become apparent from the following detailed description that the novel and unobvious combination of a one piece fixed shaft and hydraulic motor support that also provides for fluid intake and discharge, along with a stub shaft that rotates with the drum, yields a drive roller design that only requires one internal bearing, is economical to manufacture, is strong and of low maintenance, is easy to disassemble, and is adaptable to different roller lengths. As such it represents clear advantages over prior art rollers that are hydraulic powered. Furthermore, the benefits of hydraulic power; compactness, no gear reduction necessary, self-cooling and easily varied speed, show that the present invention has clear advantages over electric powered rollers as well.

Other objects and advantages will become apparent from a consideration of the following description and drawing.

BEST MODE FOR CARRYING OUT THE INVENTION

Figure 1:
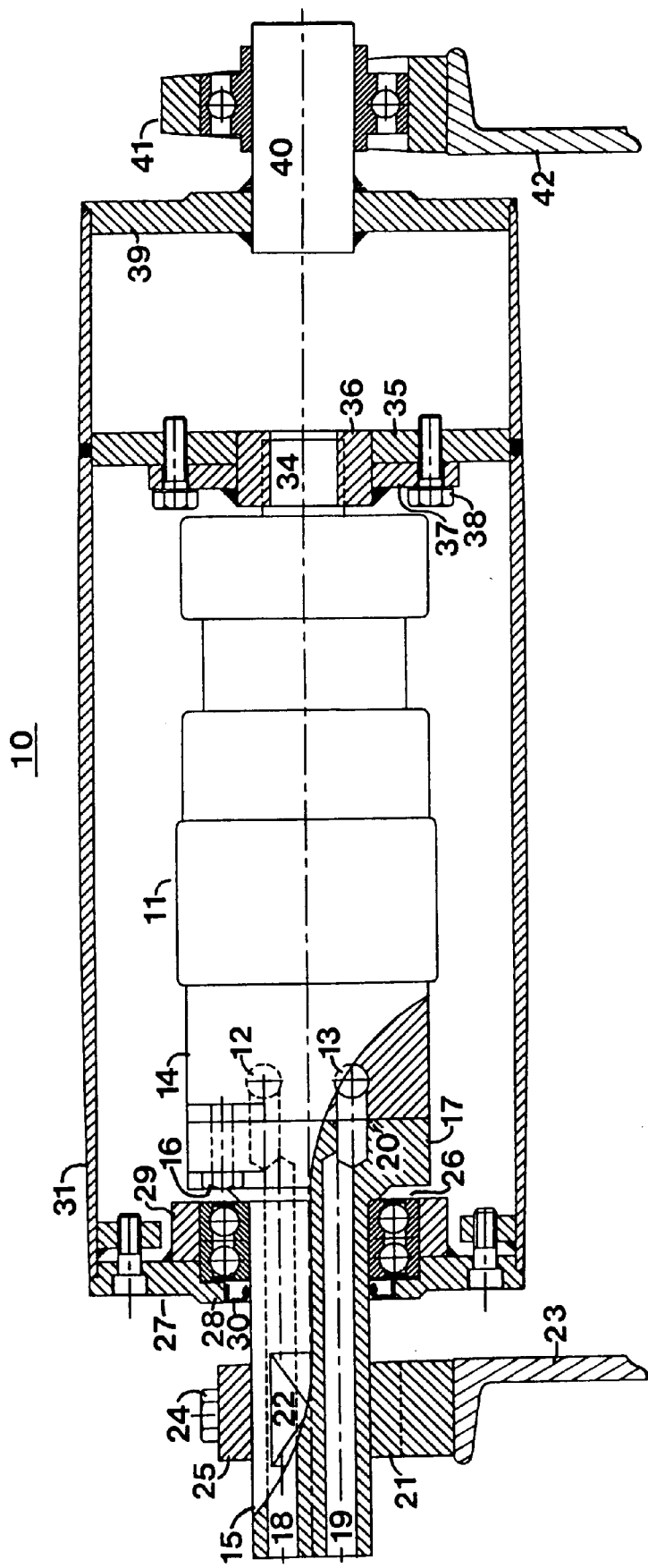
FIG. 1 is a longitudinal sectional view of a preferred embodiment of the hydraulic roller.
Figure 2:
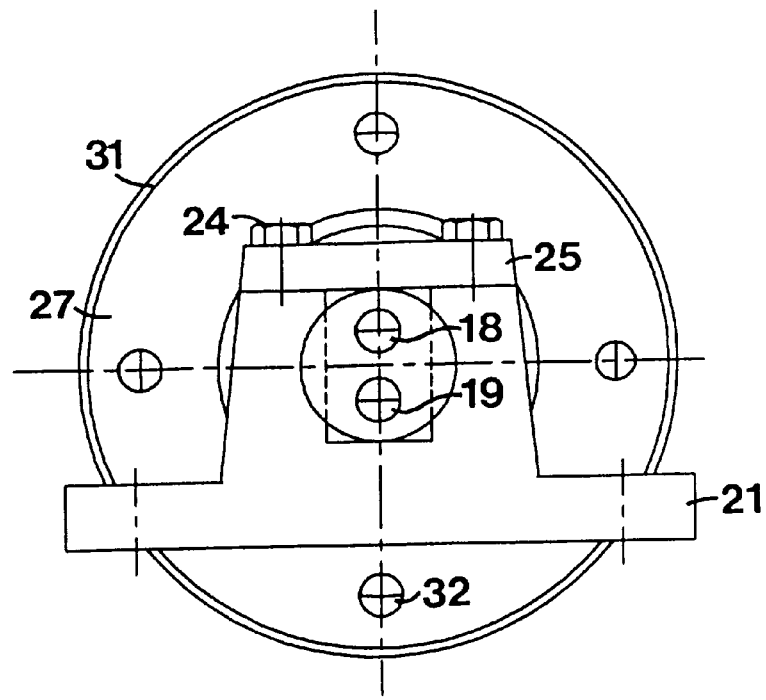
FIG. 2 is an end view of the hydraulic motor taken from the fixed-shaft end of the roller.

The hydraulic roller assembly, designated by the numeral 10, utilizes a modified, commercially available, low speed, high torque hydraulic motor 11, of conventional design, such as manufactured by White Hydraulics of Hopkinsville, Kentucky. Motor 11 may be bidirectional, with the change in rotation direction provided by external valving (not shown). Hydraulic motor 11 has an intake port 12 and discharge port 13 formed in hydraulic-motor end piece 14. In a preferred embodiment, endpiece 14 is provided with endports, however sideported motors can be modified by drilling the end piece 14 to intersect ports 12 and 13 and then sealing the sideports with threaded plugs.

A motor support shaft 15 is bolted securely to motor 11 by a plurality of hex cap screws 16 that are appropriate length replacements for the stock hydraulic motor endplate screws. Motor support shaft 15 terminates in an end flange 17. A fluid intake conduit 18 and discharge conduit 19 are formed within motor support shaft 15 and are offset within the end flange 17 to align with ports 12 and 13. 0-rings 20 seal the joint between port 12 and conduit 18 and between port 13 and conduit 19. In this manner, motor support shaft 15, preferable formed from a single billet of stainless steel or similar material, provides rugged yet simple support for motor 11 as well as provides for fluid transfer to and from the motor in the simplest possible way. This design elliminates the need for fittings and tubing to transfer the fluid to and from the motor, as shown in the prior art.

Motor support shaft 15 is secured against rotation in a solid block 21. Block 21 may be fixed or adjustably mounted on conveyor frame 23 by appropriate means, depending on design considerations. Lands 22 are formed in motor support shaft 15 for securely clamping in block 21. Hex cap screws 24 attach plate 25 to the top of block 21 to vertically captivate the shaft.

A sealed, double-row radial bearing 26 is press fit on shaft 15. This bearing is sized for the specific application to take the anticipated radial load as well as any axial load due to conveyor belt misalignment. It is important to note that numerous other bearing arrangements are possible and within the scope of this invention. The outer race of bearing 26 is received in first drum end 27. Drum end 27 is composed of a first end bulkhead 28 and a ring member 29 welded to the inside of end bulkhead 28. Alternatively, drum end 27 may be formed from a one piece casting. A lip seal 30 protects bearing 26.

First drum end 27 is removeably secured to drum 31 by a plurality of hex-socket cap screws 32 threaded into annular flange 33 which is welded or otherwise secured inside drum 31. Drum 31 is constructed of stainless steel or other material suitable for the given environment. Drum 31 may be surfaced with a resilient layer lagging to thereby enhance its frictional engagement with the driven belt. Furthermore, in applications where the belt is of the chain type, the outer surface of drum 31 may be formed with appropriately shaped teeth to engage the chain structure.

The hydraulic motor output shaft 34 transfers torque to drum 31 by way of a drive flange 35 that is welded inside the bore of drum 31. Output shaft 34 is preferable splined and is received by an internally splined receiver 36 which is welded or otherwise secured to a plate 37. The combined receiver 36 and plate 37 is secured to drive flange 35 by a plurality of hex cap screws 38. It is to be understood that while the spline coupling provides a simple and strong, yet easily separable joint, other means of coupling the output shaft 33 to the drive flange 35, such as by a square key or a three-jaw, resilient-insert coupling, are within the scope of the invention.

Second drum end 39 is welded or otherwise secured to the non-bearing end of drum 31. A live shaft 40 projects from second drum end 39 and is securely welded to same. Alternatively, drum end 39 and live shaft 40 may be formed from a single piece of material. Live shaft 40 is received by a conventional fixed or adjustable pillow-block bearing 41 secured to conveyor frame member 42.

In applications wherein the drive roller is significantly longer than the hydraulic motor, it is readily apparent that the distance between drive flange 35 and drum end 39 is simply increased. The only additional material needed is in the longer drum itself. This represents a significant advantage over the prior art where at least one shaft must also be lengthened.

The hydraulic roller of this invention can be readily mounted to existing conveyor structures that utilize pillow block bearings. One of the existing pillow-block bearings 41 can be utilized and receives the rotating live shaft 40, while the opposite pillow block bearing is replaced with the solid block 21 that has the same bolt hole pattern as the conventional pillow-block bearing. This block thus provides a strong and non-rotating mount for motor support shaft 15.

Figures 3, 4:
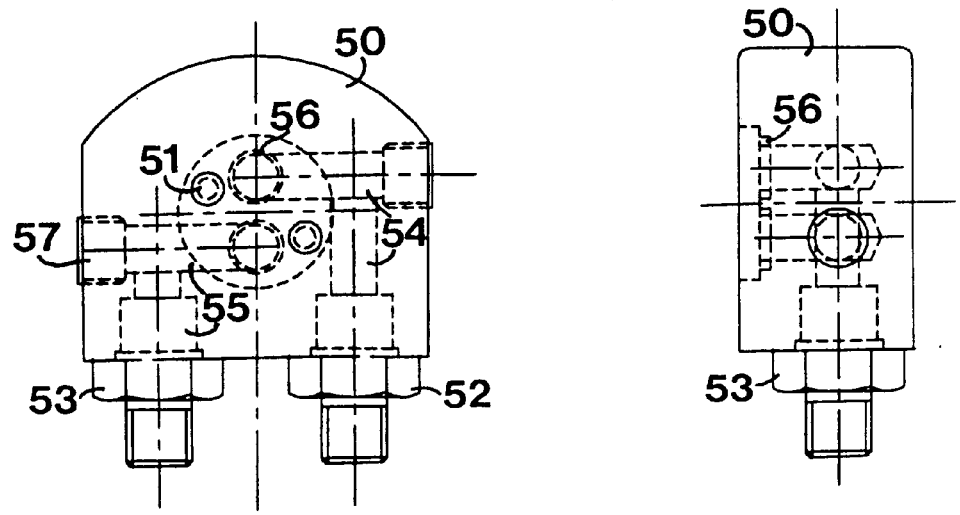
FIG. 3 is an end view of a fluid adapter block to transfer hydraulic fluid to and from the fixed shaft.
FIG. 4 is a side view of the fluid adapter block.

Referring now to FIGS. 3 and 4, a fluid-conduit adapter block 50 is bolted to the outside end of motor support shaft 15 by hex-socket cap screws 51. Block 50 receives a standard intake fitting 52 and discharge fitting 53. These fittings may be located on the ends of the hydraulic hose, tubing or pipe as required. Internally formed intake port 54 communicates with fluid intake conduit 18 and discharge port 55 communicates with fluid discharge conduit 19. 0-rings 56 seal these connections. Plugs 57 seal the holes left from the porting operation. Alternatively, the task of transferring fluid to and from the motor support shaft 15 may be performed by solid block 21 with appropriate porting and fittings.

The above description contains specifications for the purpose of illustration which should not be construed as limiting the scope of the invention. Numerous alternative embodiments and modifications are within the scope of the invention which should be determined by the appended claims and their legal equivalents.

What is claimed:

1. A fluid drive roller for use with an endless conveyor system comprising:
    a cylindrical shell having a first end, a second end, an inner surface and a peripheral surface;
    a first flange fixedly mounted to the inner surface of the shell proximate to the first end of the cylindrical shell, and a second flange fixedly mounted to the inner surface of the shell proximate to the second end of the cylindrical shell;
    a fluid motor disposed within the cylindrical shell and having a housing, a driven shaft having a first end disposed in the housing and a second end extending from the housing, a fluid inlet port, and a fluid outlet port wherein the driven shaft is directly linked to the second end flange at its second end so that rotation of the driven shaft results in a corresponding rotation of the second flange; and
    a fluid conduit having a first end, a second end, a discreet delivery subconduit fluidly coupled to the motor fluid inlet port and a discreet return subconduit fluidly coupled to the motor fluid outlet port wherein the fluid conduit is mounted to the motor housing at the first end and is rotatably linked to the first flange,
    whereby the fluid motor remains stationary when the driven shaft rotates, thereby causing rotation of the cylindrical shell.

2. The drive roller of claim 1 wherein the delivery and the return subconduits are defined by the fluid conduit.

3. The drive roller of claim 1 wherein the fluid conduit supports the motor within the cylindrical shell.

4. The drive roller of claim 1 wherein the motor driven shaft extends through the second flange.

5. The drive roller of claim 1 wherein the fluid conduit is an integral portion of the fluid motor housing.

6. The drive roller of claim 1 further comprising a first external shaft support and a second external shaft support wherein the motor shaft extends through the second flange and is rotatably receivable by the first shaft support and the fluid conduit is fixedly receivable by the second shaft support, and wherein the first and the second external shaft supports are adapted to be located on the endless conveyor system.

7. The drive roller of claim 1 wherein the fluid conduit is cylindrical, and is coaxial with the motor driven shaft.

8. The drive roller of claim 4 wherein the motor driven shaft extends through the second flange.

9. A fluid drive roller for use with an endless conveyor system comprising:
- a cylindrical shell having a first end, a second end, a peripheral surface, and an inner surface;
- a first flange fixedly mounted to the inner surface of the shell proximate to the first end of the cylindrical shell, a second flange fixedly mounted to the inner surface of the shell proximate to the second end of the cylindrical shell, and an intermediate flange disposed between the first flange and the second flange, and fixedly mounted to the inner surface of the cylindrical shell;
- a fluid motor disposed within the cylindrical shell and having a housing, a driven shaft having a first end disposed in the housing and a second end extending from the housing, a fluid inlet port, and a fluid outlet port wherein the driven shaft is directly linked to the intermediate flange at its second end so that rotation of the driven shaft results in a corresponding rotation of the intermediate flange; and
- a fluid conduit having a first end, a second end, a discreet delivery subconduit fluidly coupled to the motor fluid inlet port and a discreet return subconduit fluidly coupled to the motor fluid outlet port wherein the fluid conduit is mounted to the motor housing at the first end and is rotatably linked to the first flange,
- whereby the fluid motor remains stationary when the driven shaft rotates, thereby causing rotation of the cylindrical shell.

10. The drive roller of claim 9 wherein the delivery and the return subconduits are defined by the fluid conduit.

11. The drive roller of claim 9 wherein the fluid conduit supports the motor within the cylindrical shell.

12. The drive roller of claim 9 wherein the fluid conduit is an integral portion of the fluid motor housing.

13. The drive roller of claim 9 wherein the fluid conduit is cylindrical, and is coaxial with the motor driven shaft.

14. The drive roller of claim 13 further comprising a live shaft mounted to the second flange and projecting in direction opposite to the motor location.

15. The drive roller of claim 14 wherein the live shaft is rigidly affixed to the second flange.

16. The drive roller of claim 9 further comprising a live shaft mounted to the second flange and projecting in direction opposite to the motor location.

17. The drive roller of claim 16 wherein the live shaft is coaxial with the motor driven shaft and the fluid conduit.

18. The drive roller of claim 17 further comprises a first external shaft support and a second external shaft support wherein the live shaft is rotatably receivable by the first shaft support and the fluid conduit is fixedly receivable by the second shaft support, and wherein the first and the second external shaft supports are adapted to be located on the endless conveyor system.

19. An endless conveyor system comprising:
- a conveyor supporting structure;
- a passive roller rotationally mounted to the supporting structure;
- a drive roller comprising: (a) a cylindrical shell having a first end, a second end, a peripheral surface, and an inner surface; (b) a first flange fixedly mounted to the inner surface of the shell proximate to the first end of the cylindrical shell, a second flange fixedly mounted to the inner surface of the shell proximate to the second end of the cylindrical shell; (c) a fluid motor disposed within the cylindrical shell and having a housing, a driven shaft having a first end disposed in the housing and a second end extending from the housing, a fluid inlet port, and a fluid outlet port wherein the driven shaft is directly linked to the cylindrical shell at its second end so that rotation of the driven shaft results in a corresponding rotation of the intermediate flange; and (d) a fluid conduit having a first end, a second end, a discreet delivery subconduit fluidly coupled to the motor fluid inlet port and a discreet return subconduit fluidly coupled to the motor fluid outlet port wherein the fluid conduit is mounted to the motor housing at the first end and is rotatably linked to the first flange, whereby the fluid motor remains stationary when the driven shaft rotates, thereby causing rotation of the cylindrical shell; and
- an endless belt at least partially encircling the passive roller and the drive roller.

20. The system of claim 19 wherein the driven shaft is rotationally linked to and extends through the second flange and wherein the driven shaft in combination with the fluid conduit, supports the drive roller when the roller is positioned on a first shaft support mounted to the supporting structure and adapted to receive the fluid conduit, and a second shaft support mounted to the supporting structure and adapted to receive the driven shaft.

21. The system of claim 19 further comprising an intermediate flange disposed between the first flange and the second flange, and mounted to the inner surface of the cylindrical shell; and a live shaft extending from the second flange.

22. The system of claim 21 wherein the driven shaft is rotatably linked to the intermediate flange and the fluid conduit extends through the first flange, and wherein the live shaft in combination with the fluid conduit, supports the drive roller, the roller is positioned on a first shaft support mounted to the supporting structure and adapted to receive the fluid conduit, and a second shaft support mounted to the supporting structure and adapted to receive the live shaft.

* * * * *

UNITED STATES PATENT AND TRADEMARK OFFICE
CERTIFICATE OF CORRECTION

PATENT NO. : 6,125,993
DATED : October 3, 2000
INVENTOR(S) : Ulf G. Hansson

It is certified that error appears in the above-indentified patent and that said Letters Patent is hereby corrected as shown below:

In claim 22, line 54, after the first "roller", please delete "," and insert --when--.

Signed and Sealed this

Seventeenth Day of April, 2001

Attest:

NICHOLAS P. GODICI

*Attesting Officer*   *Acting Director of the United States Patent and Trademark Office*